2 Sheets--Sheet 1.
H. R. ROBBINS.
Improvement in Fire-Place Heating-Stoves.
No. 5,145. Reissued Nov. 12, 1872.
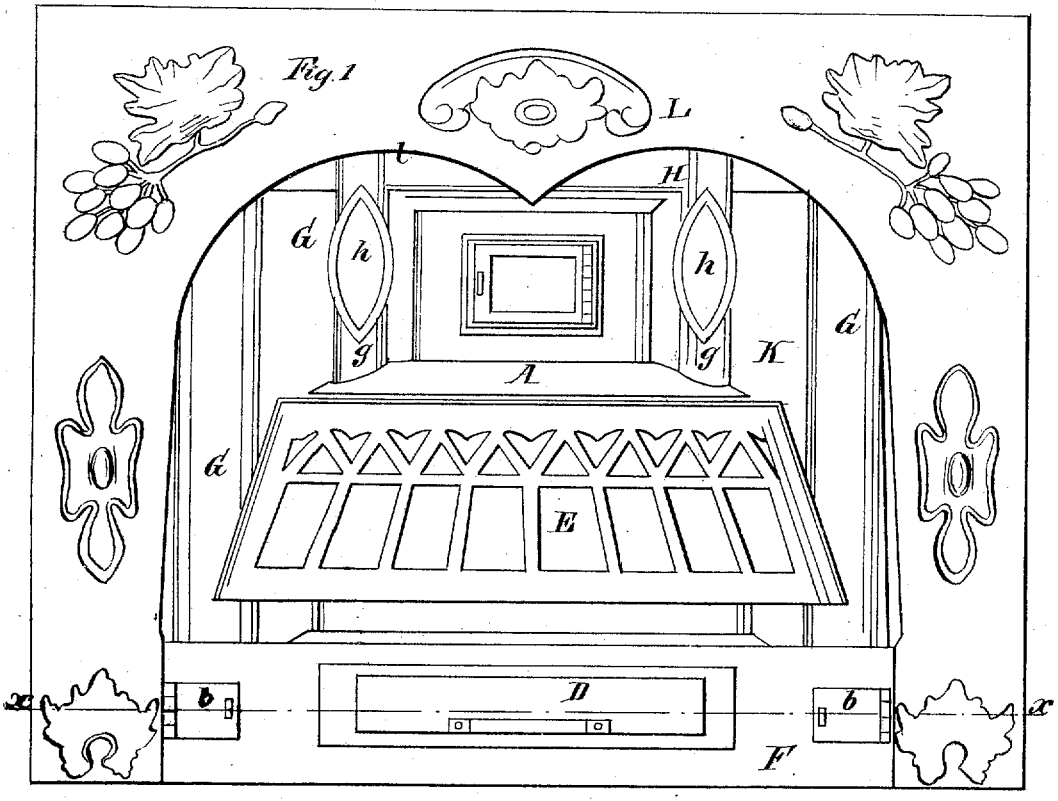
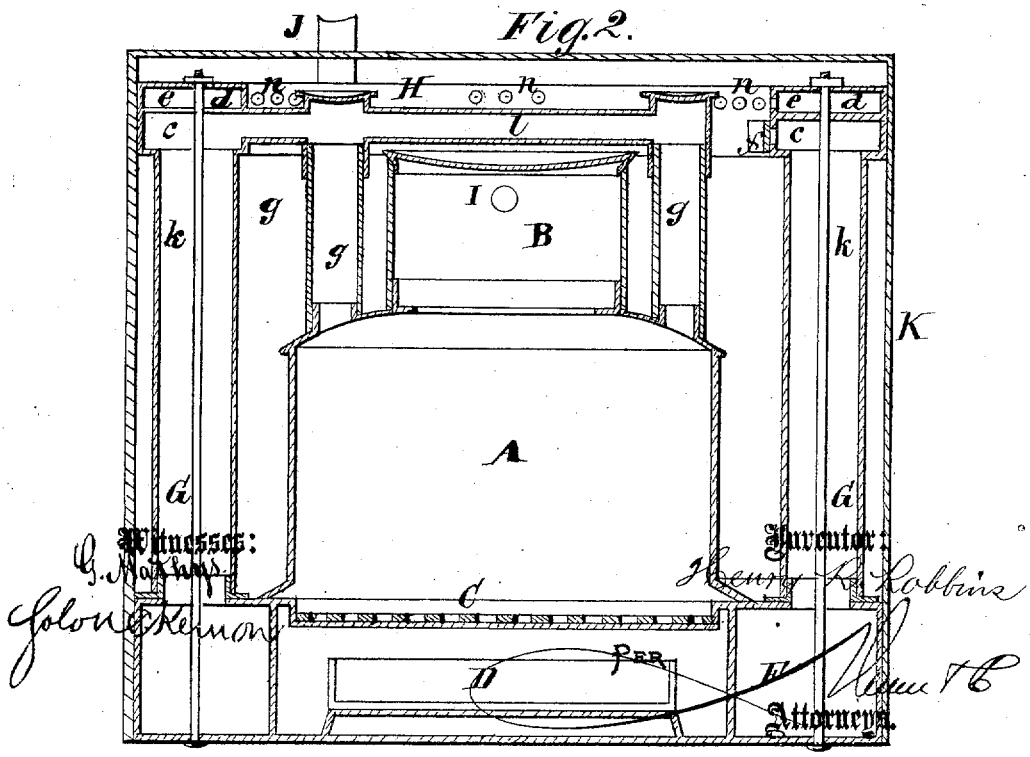
Witnesses:
G. Mackays
Solon Kemon
Inventor:
Henry R. Robbins
per
Munn & Co
Attorneys.
AM PHOTO-LITHOGRAPHIC CO. N.Y. (OSBORNE'S PROCESS.)

2 Sheets--Sheet 2.

H. R. ROBBINS.

Improvement in Fire-Place Heating-Stoves.

No. 5,145. Reissued Nov. 12, 1872.

Witnesses:

G. Mathys

Jacob Hanson

Inventor:

Henry R. Robbins

Per Henry R. Robbins

Attorneys.

AM. PHOTO-LITHOGRAPHIC CO. N.Y. (OSBORNE'S PROCESS.)

UNITED STATES PATENT OFFICE.

HENRY R. ROBBINS, OF BALTIMORE, MARYLAND.

IMPROVEMENT IN FIRE-PLACE HEATING-STOVES.

Specification forming part of Letters Patent No. 23,396, dated March 29, 1859; reissue No. 5,145, dated November 12, 1872.

*To all whom it may concern:*

Figure 4:
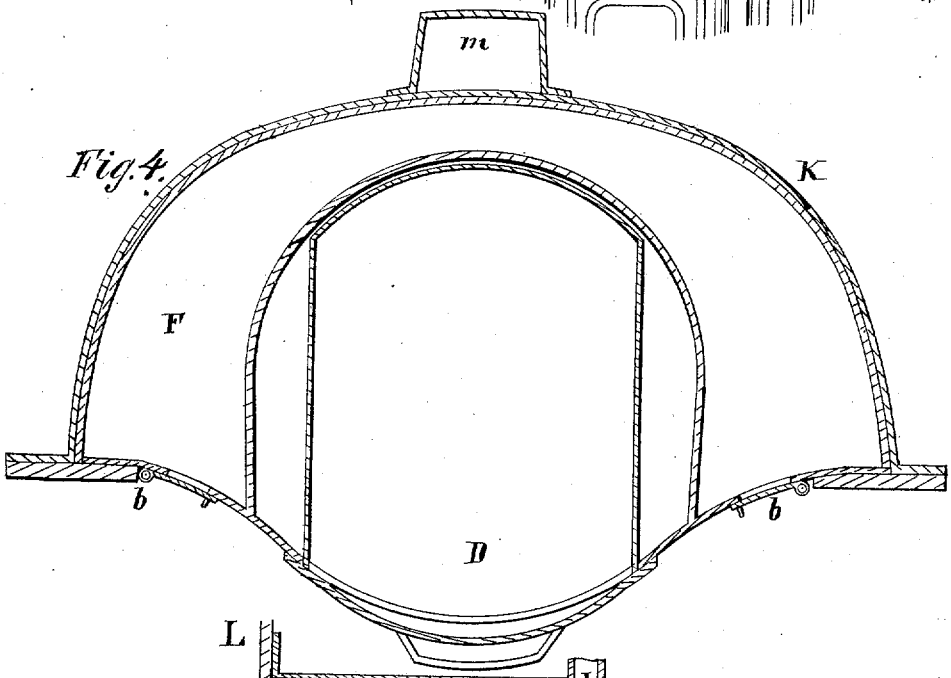
Figure 3:
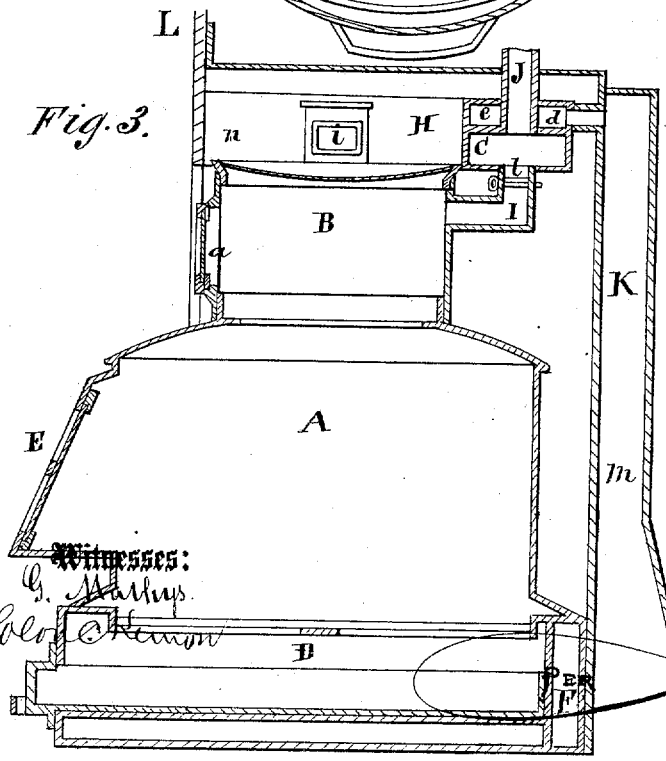

Be it known that I, HENRY R. ROBBINS, of Baltimore, in the county of Baltimore and State of Maryland, have invented a new and useful Improvement in Stoves, of which the following is a specification:

Figure 1 represents a front view of a stove constructed according to my improvement; Fig. 2 is a vertical longitudinal section thereof; Fig. 3, a vertical transverse section of the same; and Fig. 4, a horizontal section taken as denoted in the line *x x* in Fig. 1.

Similar letters of reference in each of the several figures indicate corresponding parts.

My improvement relates to that description of stoves in which the body proper of the stove has connected with it auxiliary or outside air heating and distributing and radiating appliances; and consists in certain features of advantageous construction and arrangement designed to adapt the stove in a close, economical, and ornamental manner to fit into the usual hearth or fire-place of a room where such disposition of the stove is preferred.

To enable others skilled in the art to make and use my invention, I will proceed to describe its construction and operation.

A is the fire pot or chamber, of cylindrical form, surmounted by a heat-pot, B, having a deflector, top, and front door, *a*, which latter serves to cover the charging-apertures, and whereby the fuel may be supplied to the fire-pot above the burning mass, and without let or hindrance from the mass in a heated state, and without risk of the dress of the person feeding in the coal taking fire from an outward blast. C is the fire-grate, pivoted to rock horizontally when it is desired to clear the grate-bars of ashes or dirt obstructing the draft; and D the ash pan or drawer, arranged to slide out in front. The fire-chamber A, which may be suitably lined, is cut away or formed with an opening in front nearly the whole of its depth, and for nearly or about half its circumference, which opening is incased with an ornamental transparent face-plate, E, of curvilinear form in its cross run, but set inclined in direction of its depth so as to project considerably more at the bottom than the top, in order that the fire may be reflected through it in an oblique direction upwardly to meet in a direct and cheerful manner the face of a person sitting or standing in moderate proximity to the stove, and this at different points of observation round the front by reason of the encircling character of said face-plate. The fire-chamber, with its transparent face-plate and heat-pot, rests on a hollow pedestal or stand, F, of the form shown in Fig. 4, and which serves, by side doors *b b* in front, to admit and pass, at pleasure, air from the room, in any desired amount, round the ash box or pit, and up through side columns G G into the lower passage *c* of a horizontally-divided upper back-encircling chamber, H, that, by means of a partition-plate, *d*, is divided into an upper passage, *e*, and lower passage *c*. These doors *b b* allow the draft to be checked and enable the flues to be cleaned. The smoke-pipe I is carried from the heat-pot B up into the lower passage *c* of the upper back-encircling chamber H, and the smoke passed from thence up through an adjacent pipe, J, arranged to pass through the upper passage *e* of the upper back-encircling chamber, and to form a communication with the lower passage *c* thereof. In addition to the smoke-pipe I from the heat-pot, the fire-chamber A is surmounted on each side of the heat-pot with heat or smoke pipes *g g*, provided in front with transparent reflectors *h h* and connected at top by a horizontal pipe, *l*, situated over the heat-pot, and extended to connect on one side with the lower or smoke passage *c* of the upper back-encircling chamber H, which latter may be firmly held to the lower portion of the structure by vertical bolts K K passed within the side columns G G. The main smoke-pipe I may be provided with the usual throttle-damper, to be operated by rods suitably arranged for the purpose; but it is not on this damper alone, nor yet on it in conjunction with the ash-drawer D, that I depend for every necessary regulation of the draft, for not only do the pedestal F with its side doors *b b*, columns G G, back-encircling upper chamber H with its side doors *f*, and fire-chamber heat-pipes *g g* and *i* serve to establish a large reflecting and air heating and diffusing surface, but the doors *f* and *b b* are useful, in addition, to regulate the draft; and by their combined action, arranged as described, I find a most beneficial effect, in this respect, is attained, as by them the draft may be quickly checked when the stove becomes overheated without producing a too sudden diminution in the temperature of the room by reason of the increased air circulation and reflecting capacity which is established in so checking the draft. Such an arrangement is necessarily productive of a large degree of economy in the consumption of fuel; but I enhance the value of the whole structure, in this respect, by encircling the back and top of the stove with a reflecting-bonnet or back-case, K, having, too, in its rear, a conduit or pipe, *m*, which serves to conduct cool air from below up into the upper passage passage *e* of the back upper encircling-chamber H, from which, when heated, the air escapes, by perforations *n n*, into the room. A front plate, L, of an ornamental character, and forming "pilasters" and "entablature," is fitted onto the back bonnet or case in front, and serves to adapt this economical and convenient stove arrangement to fit in the fire-place of a room, where it may be placed, by reason of its structure and regulating contrivances, to more advantage than most or all other stoves.

Figure 5:
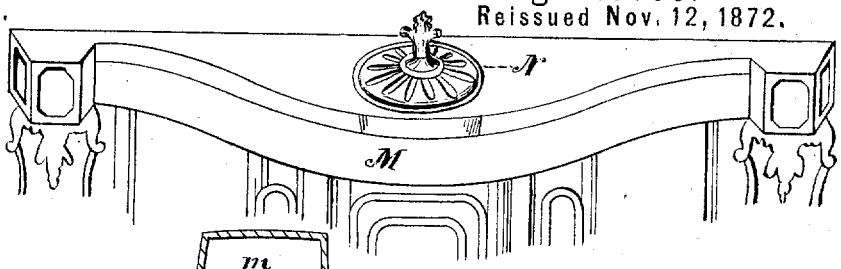

Instead of the plate L a frontispiece, M, similar to that shown in Fig. 5, may be employed.

The construction of the stove when the plate M is used is substantially the same as described, excepting that the shape of the casting must be adapted to the position and form of the frontispiece M. The object of using the frontispiece M is that the stove may be thrown slightly out of the fire-place and an ornamental pot, N, for containing water placed on the same, as represented.

By arranging a stove with respect to a fire-place so that a large portion of the face thereof shall project into the room the surface radiating into the latter is greatly increased and a much larger proportion of the heat thrown into the chamber wherein the stove is located.

Having thus described my invention, what I claim as new, and desire to secure by Letters Patent, is—

1. The fire-pot A, cut away in front nearly its whole depth and about half its circumference, as described, so as to adapt it to project into the room and to receive a transparent face-place.

2. A fire-place stove having a portion of the cylinder or fire-pot projecting into the room, substantially as and for the purpose described.

3. The face-plate E, constructed on a curve and inclined outwardly toward the base, as described, to adapt it to reflect the fire obliquely and at different points of observation.

4. The face-plate E, as described, provided with windows or mica-lights, as and for the purpose set forth.

5. The smoke-pipes *g g*, arranged above and leading from upper part of fire-pot A, as shown and described, for heating purposes.

HENRY R. ROBBINS.

Witnesses:
SOLON C. KEMON,
THOS. D. D. OURAND.